US012676950B2

(12) United States Patent
Quiroga Sepulveda et al.

(10) Patent No.: US 12,676,950 B2
(45) Date of Patent: Jul. 7, 2026

(54) SYNCHRONIZATION OF VIDEO CAMERAS

(71) Applicant: Genius Sports SS, LLC, Los Angeles, CA (US)

(72) Inventors: Julian Armando Quiroga Sepulveda, Medellín (CO); Edisson O. Maldonado López, Medellín (CO)

(73) Assignee: Genius Sports SS, LLC, Los Angeles, CA (US)

( * ) Notice: Subject to any disclaimer, the term of this patent is extended or adjusted under 35 U.S.C. 154(b) by 85 days.

(21) Appl. No.: 18/498,761

(22) Filed: Oct. 31, 2023

(65) Prior Publication Data

US 2024/0146894 A1    May 2, 2024

Related U.S. Application Data

(60) Provisional application No. 63/420,858, filed on Oct. 31, 2022.

(51) Int. Cl.
| | |
|---|---|
| *H04N 13/167* | (2018.01) |
| *H04N 13/282* | (2018.01) |
| *H04N 13/296* | (2018.01) |

(52) U.S. Cl.
CPC ......... *H04N 13/167* (2018.05); *H04N 13/282* (2018.05); *H04N 13/296* (2018.05)

(58) Field of Classification Search
CPC .. H04N 13/167; H04N 13/282; H04N 13/296; H04N 7/181; H04N 21/21805; H04N 21/2187; H04N 5/04; H04N 23/661; H04N 23/90; H04N 5/222; H04N 7/56
USPC ......................................................... 348/48
See application file for complete search history.

(56) References Cited

U.S. PATENT DOCUMENTS

| | | | |
|---|---|---|---|
| 7,665,113 B1 | 2/2010 | Abrams | |
| 8,644,757 B2 * | 2/2014 | Curcio | G06F 1/1626 |
| | | | 345/157 |
| 9,122,443 B1 | 9/2015 | Lambom et al. | |
| 9,544,492 B2 * | 1/2017 | Zhang | H04N 5/06 |
| 9,654,817 B2 | 5/2017 | Li | |
| 10,972,637 B2 * | 4/2021 | Bangs | H04N 13/296 |
| 10,979,477 B1 | 4/2021 | Cabrido et al. | |
| 2010/0171841 A1 | 7/2010 | Dobrin | |
| 2011/0110360 A1 | 5/2011 | Fenwicket et al. | |

(Continued)

FOREIGN PATENT DOCUMENTS

| | | |
|---|---|---|
| CN | 111343401 A | 6/2020 |
| EP | 4254966 A1 | 10/2023 |
| WO | 2020125643 A1 | 6/2020 |

OTHER PUBLICATIONS

Ansari et al: "Wireless Software Synchronization of Multiple Distributed Cameras" In: arXiv, Jun. 11, 2019, [online] [retrieved on Jan. 4, 2024 (Apr. 1, 2024)] Retrieved from the Internet URL: https://arxiv.org/abs/1812.09366v2 >, entire document.

(Continued)

*Primary Examiner* — Susan E. Hodges
(74) *Attorney, Agent, or Firm* — EIP US LLP

(57) ABSTRACT

Disclosed are systems and methods for synchronously capturing video using respective cameras of a plurality of devices. The devices capture video according to a schedule based on a common camera period and a common synchronized clock, and adjust their video capture parameters based on departures from the schedule.

19 Claims, 4 Drawing Sheets

(56)　　　　　References Cited

U.S. PATENT DOCUMENTS

| | | | |
|---|---|---|---|
| 2012/0092443 A1 | 4/2012 | Mauchly | |
| 2015/0215563 A1* | 7/2015 | Yanagidate | H04N 23/90 |
| | | | 348/500 |
| 2019/0037018 A1 | 1/2019 | Scurrell et al. | |
| 2019/0068704 A1* | 2/2019 | Block | H04L 67/1095 |
| 2022/0006922 A1* | 1/2022 | Bathija | H04N 23/661 |
| 2022/0030214 A1* | 1/2022 | Sinharoy | H04N 13/194 |

OTHER PUBLICATIONS

International Search Report and Written Opinion dated Mar. 5, 2024 for PCT Application No. PCT/US23/36480.

Cahyadi et al, "Optical Camera Communications: Principles, Modulations, Potential and Challenges", Electronics, vol. 9. https://nrl.northumbria. ac. uk/id/ eprint/ 4413 9/1/ electronics-09-013 3 9. pdf, Aug. 19, 2020.

Solar Chat, ""How many fps with your high speed camera?"", https://www.solarchatforum.com/viewtopic.php?t=19860, May 19, 2016.

United Kingdom Examination Report dated Oct. 16, 2024 for GB Application No. GB2316657.2.

United Kingdom Search Report dated May 14, 2024 for United Kingdom Application No. GB2316657.2.

Edouard Laroche et al., "Dynamical Models for Position Measurement with Global Shutter and Rolling Shutter Cameras", May 16, 2014.

François Bérard et al. "Two Touch System Latency Estimators: High Accuracy and Low Overhead", https://inria.hal.science/hal-00953359, Feb. 28, 2014.

Syukron Abu Ishaq Alfarozi et al., "Square Wave Quadrature Amplitude Modulation for Visible Light Communication Using age Sensor", May 18, 2019.

European Extended Search Report dated Jul. 25, 2024 for European Application No. 23207117.5.

* cited by examiner

SYNCHRONIZATION OF VIDEO CAMERAS

CROSS-REFERENCE TO RELATED APPLICATIONS

The present application claims the benefit of U.S. Patent Application Ser. No. 63/420,858, filed Oct. 31, 2022 and entitled "SYNCHRONIZATION OF VIDEO CAMERAS OVER IP".

The content of the foregoing application is hereby incorporated by reference in its entirety for all purposes.

BACKGROUND OF THE INVENTION

Field of the Invention

The present invention relates to methods and systems for synchronizing video capture by a plurality of devices, in particular portable electronic devices such as smartphones or tablets. In examples disclosed herein, the methods and systems are used to capture video of a sporting activity, such as a sporting event or a practice session, with the plurality of devices being used to capture video of the activity from multiple viewpoints.

Description of the Related Technology

Sports serve as a vital source of entertainment and leisure for millions of people worldwide. The use of video in sports has revolutionized the way teams and athletes analyze, strategize, and improve their performance. Video analysis allows for detailed review of gameplay, technique, and tactics, providing valuable insights that can lead to enhanced performance on the field. Coaches can study their team's strengths and weaknesses, identify patterns, and make data-driven decisions to optimize strategies. Players can analyze their own performances, identify areas for improvement, and refine their skills with precision.

Video technology has also transformed the fan experience, allowing spectators to relive and dissect pivotal moments, gain deeper understanding of the game, and engage in discussions and debates with other fans.

SUMMARY

In accordance with a first aspect of the present disclosure there is provided a system for capturing video, the system comprising: a plurality of electronic devices, each of which comprises a respective camera; and at least one server, which is configured to transmit a synchronized clock value to each of the plurality of devices, and to receive video data from each of the plurality of devices, wherein the system is configured to determine a camera sync time, including by adding an integral number of camera periods to the synchronized clock value, and wherein each of the plurality of devices is configured to: capture video using the camera of the device; determine that the camera sync time has passed, and, in response, determine a camera offset by calculating a difference between a timestamp time for a current frame captured by the device, and the camera sync time; and adjust one or more video capture parameters of the device based on said camera offset.

In some examples, each of the plurality of devices is configured to: compare said camera offset with a threshold; and adjust said one or more video capture parameters of the device based on an amount by which the camera offset exceeds said threshold.

Additionally, or alternatively, the system may be further configured to: determine one or more additional camera sync times, including by, for each of the one or more additional camera sync times, adding a second integral number of camera periods to an immediately preceding camera sync time, wherein each of the plurality of devices is further configured to: capture video using the camera of the device; and for each of the one or more additional camera sync times, determine that the additional camera sync time has passed, and, in response, determine a camera offset by calculating a difference between a timestamp time of a current frame captured by the device and the additional camera sync time, and then adjust one or more video capture parameters of the device based on said camera offset. In examples, the second integral number is equal to said integral number.

In examples, each of the plurality of devices is configured such that, the adjusting of the one or more video capture parameters by the device comprises capturing a frame with an exposure time that is determined based on the camera offset for the device. Additionally, or alternatively, each of the plurality of devices is configured such that, the adjusting of the one or more video capture parameters by the device comprises temporarily increasing or decreasing a capture period for the device based on the camera offset for the device. Additionally, or alternatively, each of the plurality of devices is configured such that, the adjusting of the one or more video capture parameters by the device comprises ceasing video capture by the device for a period of time that is determined based on the camera offset for the device.

In some examples, each of the plurality of devices is configured to transmit video data to the at least one server using Internet Protocol. Additionally, or alternatively, the at least one server is configured to transmit the synchronized clock value to each of the plurality of devices using Internet Protocol.

In some examples, the at least one server comprises a clock server, which is configured to transmit said synchronized clock value to each of the plurality of devices. The clock server may, for example, be configured to transmit said synchronized clock value to each of the plurality of devices using Internet Protocol.

In some examples, the at least one server (and, in particular examples, a/the clock server comprised by the at least one server) is configured to: store a current server time; and transmit a request to each of the plurality of devices for a current device time, wherein each of the plurality of devices is configured to transmit the current device time for the device to the at least one server (e.g., the clock server), in response to receiving the request, and wherein the at least one server (e.g., the clock server) is further configured to determine a first clock offset for each of the plurality of devices, using the current server time, the current device time for the device, and a transmission time for communication between the at least one server (e.g., the clock server) and the device. In such examples, the at least one server (e.g., the clock server) may be configured to: determine a second clock offset for each of the plurality of devices; and determine a clock drift for each of the plurality of devices by comparing the first and second clock offsets for the device.

In some examples, the at least one server comprises a grabber server, and each of the plurality of devices is configured to transmit video data to the grabber server. In such examples, the plurality of devices may be configured to transmit video data to the grabber server using Internet Protocol.

In some examples, the at least one server is configured to determine a camera period for the cameras of the plurality of devices, including by triggering at least a group of the plurality of devices to capture video and to measure a camera period for each device of the group while the group of the plurality of devices is capturing video, the at least one server determining the camera period for the cameras of the plurality of devices based on said measured camera periods for the group of devices.

In accordance with a further aspect of the present disclosure there is provided a method for synchronizing video capture by respective cameras of a plurality of devices, the method comprising: determining a camera period for the cameras of the plurality of devices; determining a camera sync time, including by adding an integral number of camera periods (T) to a synchronized clock value; capturing video at each of the plurality of devices, using the respective cameras of the plurality of devices; at each of the plurality of devices, once the device has determined that the camera sync time has passed, determining a camera offset by calculating a difference between a timestamp time of a current frame captured by the device, and the camera sync time; adjusting one or more video capture parameters for one or more devices of the plurality of devices, based on the respective camera offsets for the one or more devices.

In examples, the method comprises, at each of the plurality of devices, comparing the camera offset of the device with a threshold, wherein the adjusting of the one or more video capture parameters for the device is based on an amount by which the camera offset for the device exceeds said threshold.

Additionally, or alternatively, the method further comprises: determining one or more additional camera sync times, including by, for each of the one or more additional camera sync times, adding a second integral number of camera periods to an immediately preceding camera sync time; capturing video using the camera of each of the plurality of devices; and for each of the plurality of devices and for each of the one or more additional camera sync times, once the device has determined that the additional camera sync time has passed, determining a camera offset by calculating a difference between a timestamp time of a current frame captured by the device and the additional camera sync time, and then adjusting one or more video capture parameters of the device based on said camera offset. In examples, the second integral number is equal to said integral number.

In some examples, said adjusting comprises, for each of the one or more devices, triggering the device to capture a frame with an exposure time that is determined based on the camera offset for the device. Additionally, or alternatively, said adjusting comprises, for each of the one or more devices, temporarily increasing or decreasing a capture period for the device based on the camera offset for the device. Additionally, or alternatively, said adjusting comprises, for each of the one or more devices, ceasing video capture by the device for a period of time that is determined based on the camera offset for the device.

In some examples, the method further comprises transmitting said synchronized clock value from a clock server to each of the plurality of devices. In such examples, said transmitting of said synchronized clock value may be carried out using Internet Protocol.

In some examples, the method further comprises: storing a current server time for the at least one server (and, in particular examples, a/the clock server comprised by the at least one server); transmitting, by the at least one server (e.g., the clock server), a request to each of the plurality of devices for a current device time; at each of the plurality of devices, in response to receiving the request, transmitting the current device time for the device; and determining a first clock offset for each of the plurality of devices, using the current server time, the current device time for the device, and a transmission time for communication between the at least one server (e.g., the clock server) and the device. In such examples, the method may further comprise: determining a second clock offset for each of the plurality of devices; and determining a clock drift for each of the plurality of devices by comparing the first and second clock offsets for the device.

In some examples, the method further comprises transmitting video data from each of the plurality of devices to a grabber server. In such examples, the transmitting of video data may be carried out using Internet Protocol.

In some examples, determining a camera period for the cameras of the plurality of devices comprises triggering at least a group of the plurality of devices to capture video and measuring a camera period for each device of the group while the group of the plurality of devices is capturing video, and the determining of the camera period for the cameras of the plurality of devices is based on the measured camera periods for the group of devices.

In accordance with yet a further aspect of the present disclosure there is provided a device for capturing video, the device comprising: at least one processor; a camera; and a computer readable storage medium comprising instructions, which, when executed by the at least one processor, cause the device to: receive a synchronized clock value from at least one server; determine a camera sync time, including by adding an integral number of camera periods to the synchronized clock value; capture video using the at least one camera; determine that the camera sync time has passed, and, in response, determine a camera offset by calculating a difference between a timestamp time for a current frame captured by the device, and the camera sync time; adjust one or more video capture parameters based on said camera offset; and send the video to the at least one server.

In some examples, the instructions, when executed by the at least one processor, cause the device to: compare said camera offset with a threshold; and adjust said one or more video capture parameters, based on an amount by which the camera offset exceeds said threshold.

Additionally, or alternatively, the instructions may, when executed by the at least one processor, cause the device to: determine one or more additional camera sync times, including by, for each of the one or more additional camera sync times, adding said integral number of camera periods to an immediately preceding camera sync time; capture video using the camera; and for each of the one or more additional camera sync times, once the device has determined that the additional camera sync time has passed, determine a camera offset by calculating a difference between a timestamp time of a current frame captured by the device and the additional camera sync time, and then adjust one or more video capture parameters of the device based on said camera offset.

In some examples, the adjusting of the one or more video capture parameters by the device comprises capturing a frame with an exposure time that is determined based on the camera offset for the device. Additionally, or alternatively, the adjusting of the one or more video capture parameters by the device comprises temporarily increasing or decreasing a capture period for the device based on the camera offset for the device. Additionally, or alternatively, the adjusting of the one or more video capture parameters by the device comprises ceasing video capture by the device for a period of time that is determined based on the camera offset for the device.

In some examples, the instructions, when executed by the at least one processor, cause the device to send the video to the at least one server using Internet Protocol.

In accordance with a still further aspect of the present disclosure, there is provided a computer program product comprising instructions which, when the instructions are executed by at least one processor of a device for capturing video, cause the device to: receive a synchronized clock value from at least one server; determine a camera sync time, including by adding an integral number of camera periods to the synchronized clock value; capture video using the at least one camera; determine that the camera sync time has passed, and, in response, determine a camera offset by calculating a difference between a timestamp time for a current frame captured by the device, and the camera sync time; adjust one or more video capture parameters based on said camera offset; and send the video to the at least one server. In some examples, the instructions, when executed by the at least one processor, cause the device to: compare said camera offset with a threshold; and adjust said one or more video capture parameters, based on an amount by which the camera offset exceeds said threshold.

Additionally, or alternatively, the instructions may, when executed by the at least one processor, cause the device to: determine one or more additional camera sync times, including by, for each of the one or more additional camera sync times, adding said integral number of camera periods to an immediately preceding camera sync time; capture video using the camera; and for each of the one or more additional camera sync times, once the device has determined that the additional camera sync time has passed, determine a camera offset by calculating a difference between a timestamp time of a current frame captured by the device and the additional camera sync time, and then adjust one or more video capture parameters of the device based on said camera offset.

In some examples, the adjusting of the one or more video capture parameters by the device comprises capturing a frame with an exposure time that is determined based on the camera offset for the device. Additionally, or alternatively, the adjusting of the one or more video capture parameters by the device comprises temporarily increasing or decreasing a capture period for the device based on the camera offset for the device. Additionally, or alternatively, the adjusting of the one or more video capture parameters by the device comprises ceasing video capture by the device for a period of time that is determined based on the camera offset for the device.

In examples of any of the above aspects, the integral number is at least two.

In examples of any of the above aspects, at least some of the devices may be portable electronic devices, such as mobile devices. In addition, or instead, at least some of the devices may be smartphones or tablet computing devices.

Further features and advantages will become apparent from the following description, given by way of example only, which is made with reference to the accompanying drawings.

DETAILED DESCRIPTION OF CERTAIN INVENTIVE EMBODIMENTS

Embodiments of this application relate to synchronously capturing video using respective cameras of a plurality of devices. In embodiments described below, the devices capture video according to a schedule based on a common camera period and a common synchronized clock, and adjust their video capture parameters based on departure from the schedule. Particular embodiments of this application relate to capturing video of a sporting activity, in particular where video of the sporting activity is captured from multiple viewpoints using the cameras of the plurality of devices.

Video frames are referred to as being synchronized if they are captured at approximately the same instants in time. In embodiments, video frames are considered synchronized if they are captured within a threshold time window of each other. In embodiments, the threshold time window may be 1 $\mu$s, 10 $\mu$s, 1 ms, 10 ms, 100 ms or more. The threshold time window may be different for each application, equipment, or environment. For example, in applications where images do not change often, it may be acceptable to use a larger threshold time window (such as 100 ms) than for applications where video includes fast movement of objects or people. In another example, it may be appropriate to use a larger threshold time window (such as 100 ms) in systems with a large number of devices and cameras (such as 100 or more), for example because of the difficulty in synchronizing capture with such a larger number of devices. By contrast, a smaller threshold time window may be appropriate in a system with a few cameras (such as 100 or less), and hence less difficulty in synchronizing capture. In embodiments, the threshold of time window may change during the operation of the system and/or may be adjusted based on application, type of video captured, the number of devices capturing video, the distance between devices, network characteristics (latency, reliability, jitter), and the like.

Figure 1:
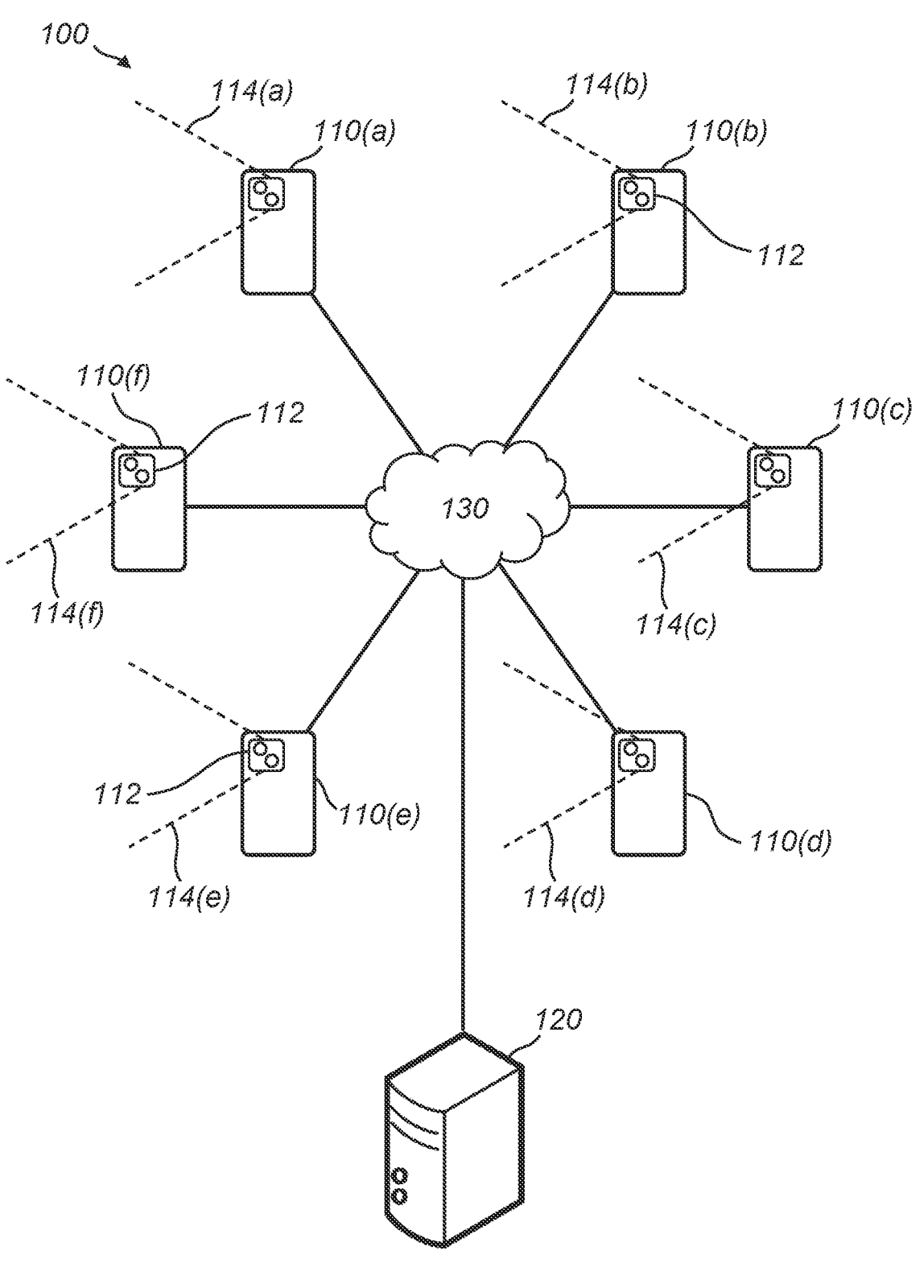
FIG. 1 is a schematic diagram illustrating a video capture system according to an illustrative embodiment.

Reference is now directed to FIG. 1, which is a schematic diagram illustrating a video capture system according to an illustrative embodiment. As shown, the system 100 comprises a plurality of devices 110(a)-(f), each of which comprises at least one camera 112. As shown, each of the devices 110(a)-(f) may, for example, be arranged to capture video from a respective, different viewpoint 114. In the particular example shown, the system 100 includes six devices 110(a)-(f); however, this is of course merely illustrative and not essential.

In the specific embodiment shown in FIG. 1, each device 110 is a portable electronic device and, more particularly, a smartphone. However, this is by no means essential and in other embodiments some or all of the devices 110(a)-(f) could be, for example, different kinds of portable electronic devices, such as tablet computing devices, or could be larger (non-portable) devices, or indeed any device having a camera (or several cameras) and sufficient processing power to operate as described herein. In embodiments, the devices 110($a$)-($f$) may lack built-in mechanisms for precise frame synchronization across devices and/or may not include special-purpose video cameras (which often do include such built-in mechanisms for precise frame synchronization across devices).

Modern portable electronic devices 110 that have cameras (such as, in particular, smartphones and tablet computing devices) are: readily available, allowing the system 100 to be easily scaled up with the addition of further portable electronic devices 110($a$)-($f$), and allowing the system 100 to be easily upgraded, taking advantage of future advances in the capabilities of portable electronic devices; straightforward to configure for use in the system 100, by installation of suitable software on the portable electronic devices 110, and by use of the wireless connectivity of the portable electronic devices 110; typically able to capture video at high resolution and/or high frame rates using the cameras of such devices; and able to offer significant processing power.

Returning to FIG. 1, it may be noted that the system 100 further comprises a server 120. As indicated by the lines in FIG. 1 extending from the electronic devices 110($a$)-($f$) and the server 120, the server 120 is in data communication with the electronic devices 110($a$)-($f$) via a network 130, which may for example be (or comprise) the internet. Hence (or otherwise), the devices 110($a$)-($f$) and the server 120 may communicate (at least partly) using Internet Protocol and/or Transmission Control Protocol. Nevertheless, it should be understood that the network 130 need not comprise the internet and hence (or otherwise), the network 130 might be (or comprise) a LAN, a VPN and/or an intranet. Furthermore, it is by no means essential that the devices 110($a$)-($f$) and the server 120 communicate using Internet Protocol or Transmission Control Protocol; other embodiments of the system 100 may utilize any communication protocols that are suitable for the particular type of network 130 that connects the devices 110($a$)-($f$) and the server 120.

It should also be appreciated that the electronic devices 110($a$)-($f$) and the server 120 may, in embodiments, communicate wirelessly, for example using 4G, 5G, or Wi-Fi protocols. Wireless connections may allow for greater flexibility over the placement/arrangement of the plurality of devices 110($a$)-($f$). Nevertheless, in other embodiments, some or all of the data connections between the portable electronic devices 110($a$)-($f$) and the server 120 could be physical connections.

The interaction of the server 120 and the devices 110($a$)-($f$) of the system of FIG. 1 will now be described. In the embodiment of FIG. 1, the server 120 is configured to periodically transmit a common synchronized clock value (t REF) to each of the plurality of devices 110($a$)-($f$) (i.e., each of the plurality of devices receives the same synchronized clock value ($t_{REF}$)), so as to assist in synchronizing video capture by the plurality of devices 110($a$)-($f$). The synchronized clock values (t REF) may be based on a reference clock on-board the server 120, or may be based on a reference clock that transmits time signals to the server 120. The server 120 is further configured to receive video data from each of the plurality of devices 110($a$)-($f$). The server 120 may carry out various processing of the received video data, for example to analyze the video and/or to prepare the video for streaming.

As mentioned above, the devices 110($a$)-($f$) use the synchronized clock value ($t_{REF}$) transmitted by the server 120 to synchronize video capture by their respective cameras. To this end, each device 110($a$)-($f$) is configured (e.g., by suitable programming of on-board processor(s)) to determine a camera sync time ($t_{sync[1]}$), which is in the future, from the synchronized clock value ($t_{REF}$) and from an integral number (n) of camera periods (T). For example, the determination of the camera sync time ($t_{sync[1]}$) by each device 110($a$)-($f$) may comprise adding an integral number (n) of camera periods (T) to the synchronized clock value ($t_{REF}$). To assist in synchronizing video capture, the same value for n is used by all of the devices 110($a$)-($f$).

In embodiments, the same camera period (T) is used for determining the camera sync time ($t_{sync}$) at every device. The value for the camera period (T) may, in some cases, be determined by measuring respective values for the camera periods of a group of the plurality of devices 110($a$)-($f$) (or, in some cases, all of the devices) during operation of the devices. For instance, respective values for the camera periods of a group of (or all of) the plurality of devices 110($a$)-($f$) may be measured during a test run of the devices.

Such measuring of the camera periods for some or all of the devices 110($a$)-($f$) may be triggered by the server 120. For instance, the server 120 may transmit or broadcast a message to each of the plurality of devices 110($a$)-($f$) that causes the device to capture video, to measure a camera period value while capturing video, and to transmit the measured camera period value to the server 120.

It should however be appreciated that it is not essential that the value for the camera period (T) is determined by such measuring of the camera periods for some or all of the devices 110($a$)-($f$). Hence (or otherwise), in other embodiments, the camera period (T) may be based on pre-existing data/information, such as camera period data from the manufacturer(s) of the devices 110.

While it is mentioned above that the devices 110($a$)-($f$) determine the camera sync time ($t_{sync[1]}$), it should be understood that, in other examples, the server 120 could instead determine the camera sync time ($t_{sync[1]}$) and transmit it to each device 110($a$)-($f$), either separately from the synchronized clock value (t REF), or together with the synchronized clock value ($t_{REF}$).

A more detailed example of a synchronization procedure for the plurality of devices 110($a$)-($f$) of the system 100 of FIG. 1 will now be described with reference to FIGS. 2A and 2B, which are diagrams showing the timing for the capture of a series of frames 200(1)-200(12) by one of the plurality of devices 110($a$)-($f$) of the system 100 of FIG. 1. In each of FIGS. 2A and 2B, the abscissa indicates time, with the time range shown on the abscissa in FIG. 2B immediately following the time range shown on the abscissa in FIG. 2A, such that FIG. 2B is a continuation of FIG. 2A.

As may be seen, in the example of FIGS. 2A and 2B, a first frame 200(1) is captured shortly after the synchronized clock value ($t_{REF}$) and second, third and fourth frames 200(2)-200(4) are captured at successive, later times. As may also be seen from FIG. 2A, in the particular example shown, the camera sync time ($t_{sync[1]}$) is determined by adding 3 camera periods (T) to the synchronized clock value ($t_{REF}$). In other words, n=3 in the example of FIG. 2. However, this is of course merely illustrative and in other examples n could be 1, 2, 4, or any other suitable integer value.

It will be noted that the fourth frame 200(4) is captured after the camera sync time ($t_{sync[1]}$) has passed. The device 110 is configured to recognize that the camera sync time ($t_{sync[1]}$) has passed, and to determine a camera offset ($t_{offset}$) by calculating a difference between a timestamp time for a current frame captured by the device (which, in the example of FIG. 2, is the fourth frame 200(4)), and the camera sync time ($t_{sync[1]}$).

Figures 2A, 2B:
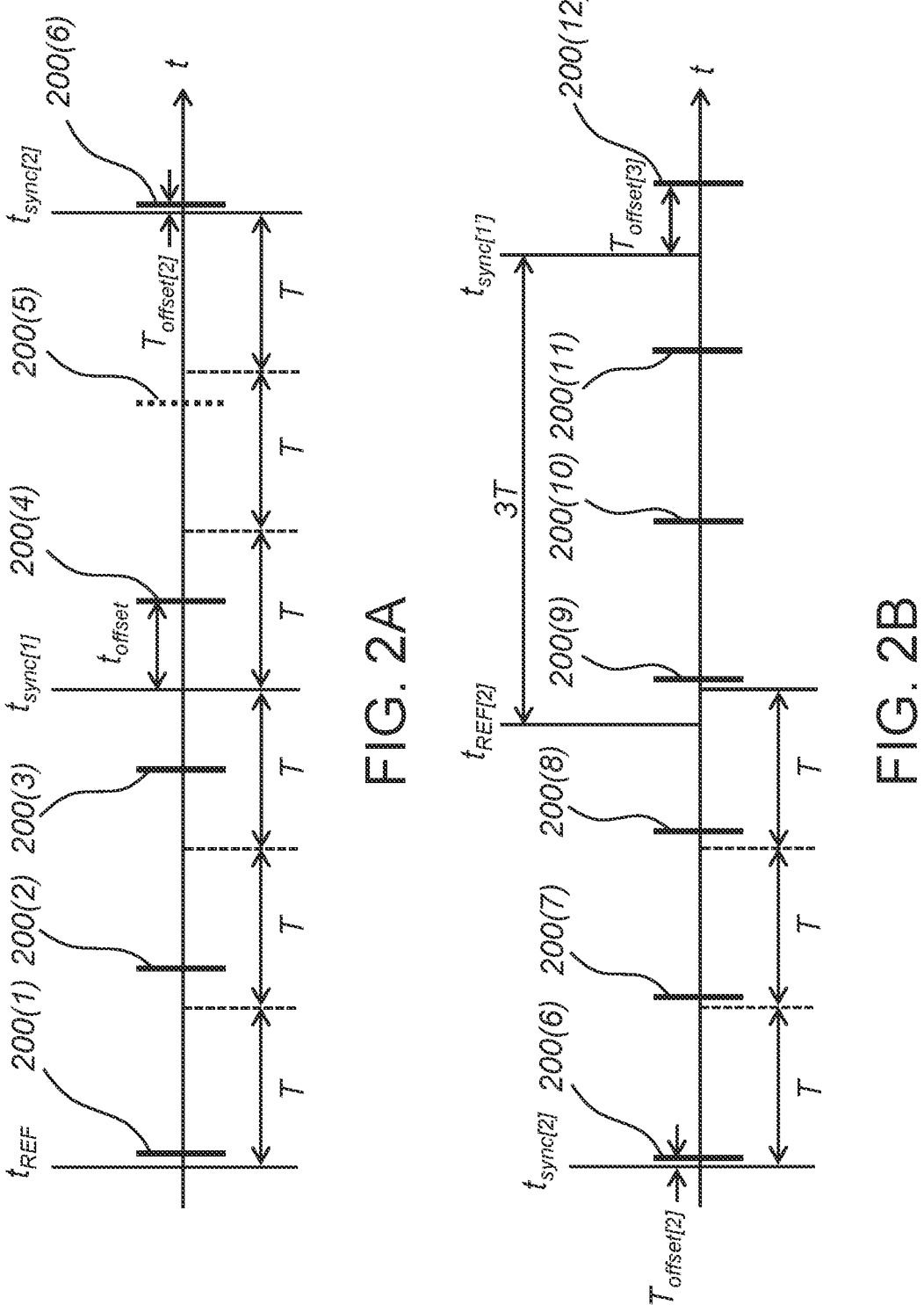
FIGS. 2A and 2B are diagrams illustrating a detailed example of a synchronization procedure for the devices of the system of FIG. 1.

According to the synchronization procedure of FIGS. 2A and 2B, the thus-determined camera offset ($t_{offset}$) is then used to determine an adjustment to one or more video capture parameters of the device 110.

The one or more video capture parameters that are adjusted by the device 110 may, for example, comprise:

Exposure time (e.g., for the immediate next frame), so that the adjusting comprises capturing a frame with an exposure time that is determined based on the camera offset ($t_{offset}$) for the device;

Capture period (e.g., for each frame until the next camera sync time) or, conversely, capture frequency, so that the adjusting comprises temporarily increasing or decreasing a capture period for the device based on the camera offset ($t_{offset}$) for the device; and/or Delay time until capture of the next frame, so that the adjusting comprises ceasing video capture by the device for a period of time that is determined based on the camera offset for the device.

In some examples, the determination of the adjustment to the one or more video capture parameters of the device 110 may be carried out by the device itself. However, in other examples, the server 120 may determine adjustments for the respective video capture parameters of a group of, or all of, the plurality of devices 110(a)-(f) in the system 100. In such examples, each device 110(a)-(f) would transmit its respective camera offset ($t_{offset}$) value to the server 120, which would in turn transmit adjustment data to the device 110 (a)-(f) indicating adjustments, based on the camera offset ($t_{offset}$), for the video capture parameters of the device 110(a)-(f). Indeed, even in examples where the determination of the adjustment to the one or more video capture parameters of the device 110 is carried out by the device itself, it may be useful for each device 110(a)-(f) to transmit its respective camera offset ($t_{offset}$) value to the server 120, for example so that the server 120 can carry out analytics on the operation of the system 100 and/or so that the server 120 can govern the overall operation of the system 100.

In various embodiments, the same video capture parameters may be adjusted at every device 110(a)-(f). For instance, it might be the case that only the exposure time is adjusted for each device 110(a)-(f). However, in more complex embodiments, different video capture parameters might be adjusted for different devices. For example, the exposure time might be adjusted for some of the devices 110(a)-(f) (e.g., those where only a minor adjustment is appropriate), whereas the capture period might be adjusted for other devices 110(a)-(f) (e.g., those where a more significant adjustment is appropriate).

In general, the adjustments to the video capture parameters of a device 110(a)-(f) may be calculated so as to reduce the expected camera offset at a subsequent camera sync time. An example of this may be seen in FIG. 2A, where, following frame 200(4), the capture period for the device is reduced, which results in the camera offset ($t_{offset[2]}$) at the second camera sync time ($t_{sync[2]}$) being significantly smaller. In embodiments, where the camera offset is determined to be less than a threshold amount, the system 100 may not carry out any adjustments of the device's camera parameters, as capture by the device's camera may be considered satisfactorily synchronized.

As is apparent from FIG. 2A, the second camera sync time ($t_{sync[2]}$) is determined by adding n camera periods (T) (where n=3, as before) to the previous camera sync time ($t_{sync[1]}$) Subsequent camera sync times are then determined in the same way.

Reference is now directed to FIG. 2B, which illustrates how the device 110 responds to receiving a second synchronized clock value ($t_{REF[2]}$) from the server 120. The time corresponding to the second synchronized clock value ($t_{REF[2]}$) is indicated on the time axis; however, it will be appreciated that the time at which the second synchronized clock value ($t_{REF[2]}$) is actually received by the device 110 will be later than the time indicated on the time axis ($t_{REF[2]}$), by an amount corresponding to the transmission time between the server 120 and the device 110.

In any case, as may be seen from FIG. 2B, following receipt of the second synchronized clock value ($t_{REF[2]}$), the immediate next camera sync time ($t_{sync[1']}$) is determined by adding n camera periods (T) to the newly-received, second synchronized clock value ($t_{REF[2]}$). Specifically, as shown, $t_{sync[1']}$ is determined by adding three camera periods (3T) to the second synchronized clock value $t_{REF[2]}$. The thus determined camera sync time, $t_{sync[1']}$, is then used to determine the camera offset ($T_{offset[3]}$). Subsequent camera sync times are then, as before, determined by adding n camera periods (T) to the previous camera sync time.

More generally, according to the synchronization procedure of FIGS. 2A and 2B, when a further (third, fourth, fifth, etc.) synchronized clock value is received from the server 120, the immediate next camera sync time is similarly determined by adding n camera periods (T) to the newly-received synchronized clock value. Subsequent camera sync times are then, as before, determined by adding n camera periods (T) to the previous camera sync time.

In some embodiments, the synchronized clock values ($t_{REF[1]}$, $t_{REF[2]}$) sent by the server 120 may, for example, correspond to evenly-spaced points in time. For instance, they might be spaced apart by an integer multiple of nT. In other embodiments, the synchronized clock values can correspond to semantically significant points in time during an activity being captured on video, for example the beginning of an event (e.g. the start of a sports match) and/or a break during an event (e.g. half-time during a sports match). Hence, or otherwise, the server 120 determine when to send a synchronized clock value to the plurality of devices 110(a)-(f) by analyzing the video received from the plurality of devices 110(a)-(f).

Returning to the system 100 of FIG. 1, to assist in synchronizing video capture by the plurality of devices 110(a)-(f), each of the plurality of devices 110(a)-(f) may comprise a clock that is synchronized with the reference clock that generates the synchronized clock values. Each such device clock may, for example, be an internal monotonically increasing system clock. As will be appreciated, various approaches can be utilized for synchronizing the clocks of the plurality of devices 110(a)-(f) with the reference clock that generates the synchronized clock values. One example of such an approach is as follows:

1. The server 120 sends a request with the current reference clock time (RCT) to each device 110, and the server 120 stores this current reference clock time value (the first reference clock time value).

2. When the request is received by a device 110, the device determines a device clock offset as the difference between the received reference clock time (the first reference clock time value) and its current device clock time, and sends a reply to the server.

3. The server 120 records the reference clock time when the reply is received as a second reference clock time value.

4. The server 120 may then compute the Round Trip Time for the server 120 and each device 110, for example by calculating the difference between the reference clock time when sending the request to each device 110 (i.e., the first reference clock time value) and the reference clock time when receiving a response from each device 110 (i.e., the second the reference clock time value for each device 110).

5. Provided that the Round Trip Time is not anomalously large (e.g., over a predetermined threshold), the server 120 then sends a message to each device with the transmission time for the device 110. The transmission time for each device 110 may, for example, be calculated as half the round trip time for the device in question.

6. When this message is received by a device 110, the device 110 adds the transmission time to its device clock offset value computed in step 2, and stores this as its reference clock offset value. The device 110 can then determine a time (a synchronized device time) that is (at least approximately) synchronized with the reference clock by adding the stored reference clock offset value to its internal clock time. Optionally, the device 110 can then send a reply to the server 120 containing its current synchronized device time.

It will however be appreciated that this is merely an illustrative example and that various other approaches can be utilized for synchronizing the clocks of the plurality of devices 110(a)-(f) with the reference clock that generates the synchronized clock values.

In embodiments, resynchronization of the device clocks can be executed whenever a clock drift above a certain threshold is detected at the server 120, periodically at a predetermined time interval that is, for example, set based on the desired synchronization precision, and/or at times that are based on other considerations, e.g. during timeouts or between periods of a sports game.

Clock drift (i.e., departure from synchronization with the reference clock) for a device clock can, for example, be determined by calculating the offset between a given device clock and the reference clock (accounting for the transmission time between the server 120 and the given device) at two points in time, e.g. separated by several minutes in time. For example, a first clock offset value could be determined at clock synchronization and a second clock offset value could be determined 10 minutes later. When the difference between the clock offset values is greater than a threshold (such as 500 μs, 1 ms, 10 ms, or more), synchronization of the device clock may be repeated.

Alternatively, or in addition, clock drift may be identified by comparing features in captured images. For example, images captured by different devices, but with the same time stamp may be compared and analyzed to determine if they captured an event at the same point in time. In embodiments, features of frames such as game time clocks, advertisements boards and the like may be used to determine time offsets between such frames captured by different devices, and thereby clock drift, using one or more of the approaches described in commonly assigned U.S. patent application Ser. No. 18/346,355.

Returning now to FIG. 1, it should be noted that, although the system 100 is shown as including only a single server 120, it will of course be appreciated that the system 100 could include multiple servers. In particular, the system 100 may, in some embodiments, include a clock server, which is configured to synchronize the clocks of the plurality of devices 110(a)-(f), including by transmitting synchronized clock values to each of the plurality of devices 110(a)-(f) (and, optionally, determining adjustments for the respective video capture parameters of a group of, or all of, the plurality of devices 110(a)-(f) and/or optionally determining clock offsets for some or all of the plurality of devices 110(a)-(f)), and a "grabber" server, which is configured to receive video data from each of the plurality of devices 110(a)-(f).

It should further be noted that, while the description above focusses on the operation of the plurality of devices 110(a)-(f), the system 100 may, in other examples, include additional devices with cameras. Indeed, such devices may be of the same type as the plurality of devices 110(a)-(f); for example, the additional devices and the plurality of devices 110(a)-(f) may be smartphones. Moreover, video capture by the additional devices may be synchronized using the same, or a different approach to the plurality of devices 110(a)-(f), or may not be synchronized at all.

Figure 3:
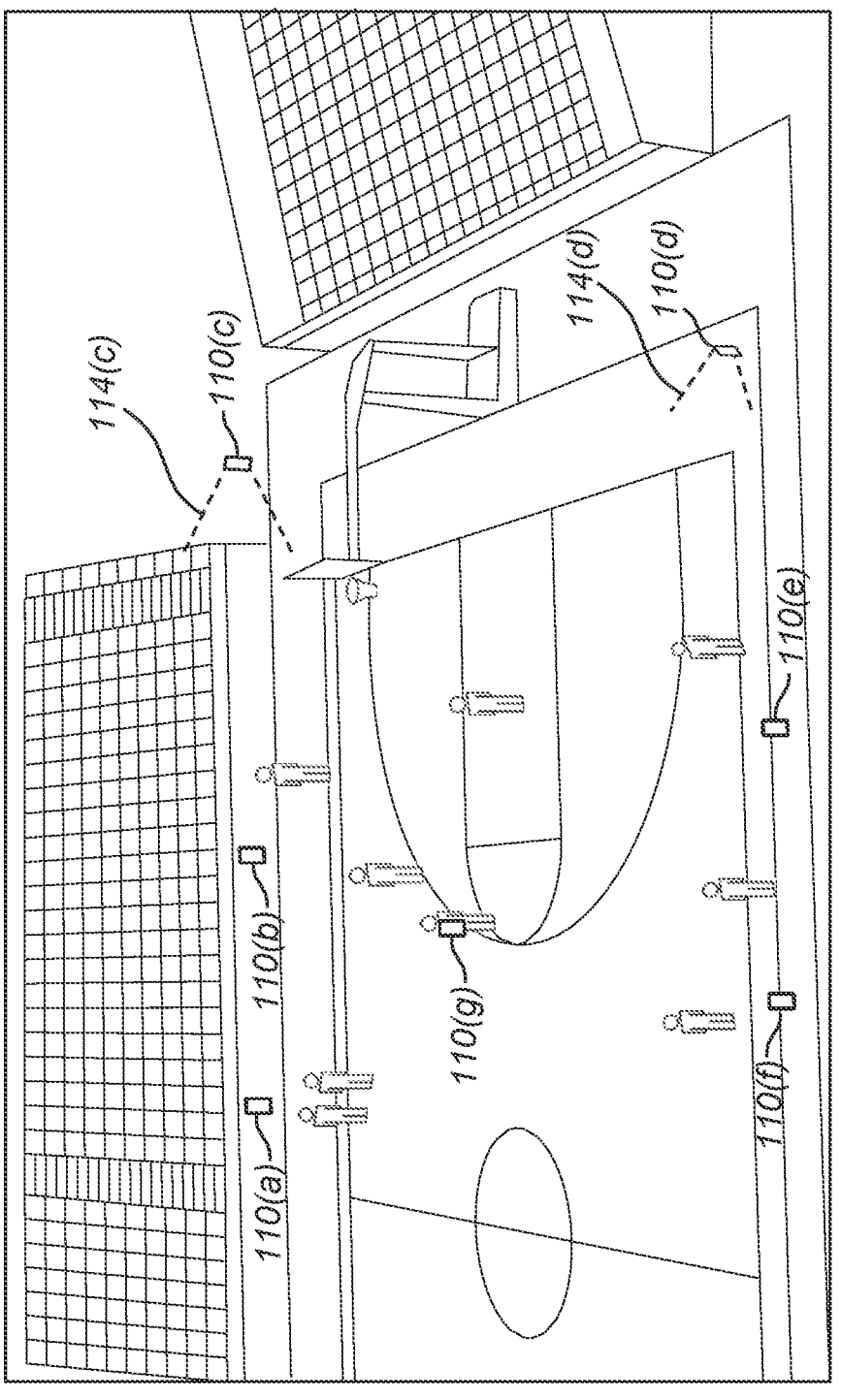
FIG. 3 is a perspective view of the system of FIG. 1 when deployed at a basketball game.

It is considered that the system 100 of FIG. 1 is particularly (but by no means exclusively) suited for use in capturing video of a sporting activity, especially where the devices 110 are portable, since they can then be easily installed at various positions and orientations to capture video of the sporting activity. Such an installation of the system 100 is illustrated in FIG. 3, which shows the system 100 when deployed to analyze a basketball game. As with the portable electronic devices illustrated in FIG. 1, each of the portable electronic devices 100(a)-(g) shown in FIG. 3 has a corresponding, different viewpoint 114 from which it captures video. As shown, most of the plurality of portable electronic devices 100(a)-(f) are arranged at various fixed positions and orientations around the basketball court. However, one of the devices 100(g) is worn by a participant in the sporting activity, providing a viewpoint of the sporting activity that would likely not be available with a conventional camera. The participant could be a player (for example, enabling data characterizing the player's movements to be gathered directly, for instance using accelerometers, gryos etc. provided on-board the portable electronic device, e.g., as part of an IMU) or could be a referee, umpire or the like (for example, to assist with automated officiating). Of course, while in the example deployment illustrated in FIG. 3 only one of the devices 100(g) is shown as being worn by a participant in the sporting activity, it should be understood that in other deployments of the system multiple (or all) of the portable electronic devices 100(a)-(g) could be worn by participants in the sporting activity, rather than being deployed at fixed positions and orientations. Moreover, in some examples, some of the portable electronic devices 100(a)-(g) could be held by coaches or even fans (e.g., the fans' own personal devices could function as the portable electronic devices 100(a)-(g) of the system 100. Furthermore, although a basketball game is depicted in FIG. 3, it will be understood that this is merely illustrative and that the system 100 of FIG. 1 is suitable for deployment at many other types of sporting activity and, indeed, is suitable for deployment in non-sporting environments, such as a non-sporting live event (e.g., a concert, a comedy show, or a play) or a non-sporting practice session (e.g., a music practice, or a rehearsal for a play).

Returning now to the system of FIG. 1, it should be noted that, in some examples, the server 120 may be located in the same physical location as the portable electronic devices 110(a)-(f). For example, in a situation where the system 100 is deployed at a sporting activity, for instance as illustrated in FIG. 3, the server 120 may be located in a server room at the venue where the sporting activity is taking place. Alternatively, the server 120 might be located in a truck parked on-site at the venue. However, in still other examples, the server 120 could be a remote/cloud server.

Moreover, where the system 100 includes multiple servers, they need not be co-located. For example, where the system 100 includes a grabber server and a clock server, the grabber server might be located in the same physical location as the plurality of devices 110(a)-(f) (or vice versa). For example, in a situation where the system 100 is deployed at a sporting activity, for instance as illustrated in FIG. 3 the grabber server may be located in a server room at the venue where the sporting activity is taking place, or in a truck parked on-site at the venue, whereas the clock server could be a remote/cloud server (or vice versa).

Figure 4:
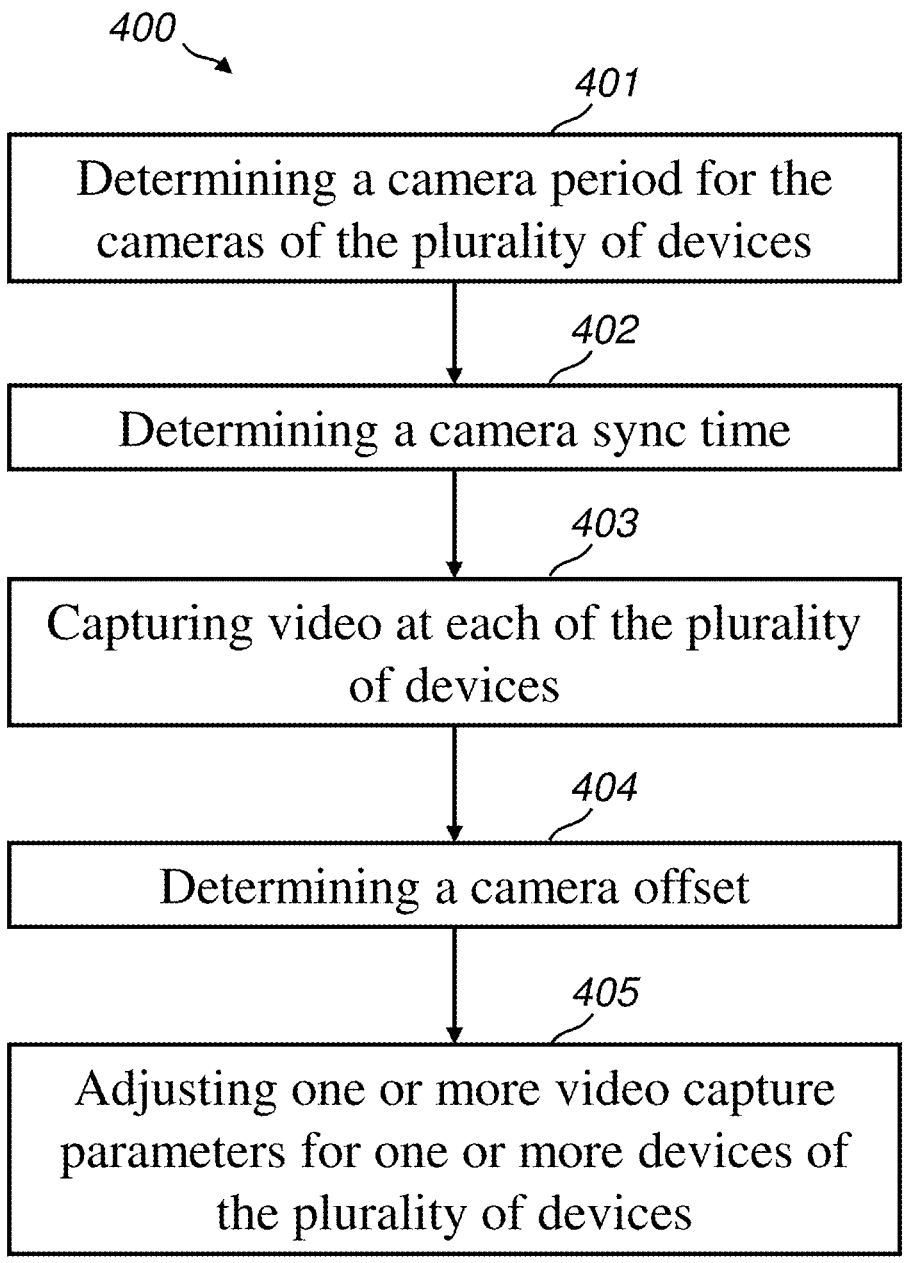
FIG. 4 is a schematic diagram illustrating a method for synchronizing video capture by respective cameras of a plurality of devices according to a further illustrative embodiment.

Attention is now directed to FIG. 4, which illustrates a method 400 for synchronizing video capture by respective cameras of a plurality of devices, according to a further aspect of this disclosure. Particular embodiments of the method 400 may incorporate principles and features taught above with reference to any embodiments of the system 100 of FIGS. 1-3. For example, the method 400 may synchronize video capture by the respective cameras of the plurality of devices 110(a)-(f) according to any of the approaches described above with reference to FIGS. 1-3.

As shown at block 401 in FIG. 4, the method comprises determining a camera period for the cameras of the plurality of devices. The determining of block 401 may implement any of the approaches for determining a camera period (T) described above with reference to FIGS. 1-3. For example, the determining may comprise triggering at least a group of the plurality of devices to capture video, and measuring a camera period for each device of the group while the group of the plurality of devices is capturing video. In such examples, the determining of the camera period for the cameras of the plurality of devices may be based on the measured camera periods for the group of devices.

As also shown in FIG. 4, the method 400 further comprises determining 402 a camera sync time, including by adding an integral number of camera periods (T) to a synchronized clock value. The determining of block 402 may similarly implement any of the approaches for determining a camera sync time described above with reference to FIGS. 1-3.

As further shown in FIG. 4, the method 400 also comprises capturing video 403 at each of the plurality of devices, using the respective cameras of the plurality of device.

As illustrated in FIG. 4, the method 400 additionally comprises, at each of the plurality of devices 110(a)-(f), once the device has determined that the camera sync time has passed, determining 404 a camera offset by calculating a difference between a timestamp time of a current frame captured by the device, and the camera sync time. The determining 404 of the camera offset for each device 110 (a)-(f) may adopt any of the approaches described above with reference to FIGS. 1-3 and, in particular, FIGS. 2A and 2B.

As also shown in FIG. 4, the method 400 further comprises adjusting 405 one or more video capture parameters for one or more devices of the plurality of devices, based on the respective camera offsets for the one or more devices. The adjusting 405 of one or more video capture parameters for one or more devices of the plurality of devices 110(a)-(f) may likewise adopt any of the approaches described above with reference to FIGS. 1-3. For example, the adjusting may comprise, for each device, triggering the device to capture a frame with an exposure time that is determined based on the camera offset for the device. Additionally, or alternatively, the adjusting may comprise, for each device, temporarily increasing or decreasing a capture period for the device based on the camera offset for the device. Additionally, or alternatively, the adjusting may comprise, for each device, ceasing video capture by the device for a period of time that is determined based on the camera offset for the device.

Although blocks 401-405 are illustrated in sequential order in FIG. 4, it will be appreciated that it is by no means essential that the actions of blocks 401-405 are carried out in the illustrated order, or, moreover that the actions of blocks 401-405 are carried out sequentially.

More generally, it is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A system for capturing video, the system comprising:

a plurality of electronic devices, each of which comprises a respective camera with which the electronic device is configured to capture video; and at least one server, which is configured to transmit a synchronized clock value to each of the plurality of devices, and to receive video data from each of the plurality of devices, wherein the system is configured to determine a first camera sync time, including by adding an integral number of camera periods to the synchronized clock value, wherein a camera period is a time interval that substantially corresponds with a respective frame capture interval configured at each of the plurality of electronic devices, the frame capture interval being the time between successive captured frames, wherein the system is further configured to determine a second camera sync time, including by adding an integral number of camera periods to the first camera sync time, wherein each of the plurality of devices is configured to:

determine that the first camera sync time has passed, and, in response, determine a first camera offset by calculating a difference between a timestamp time for a current frame captured by the device, and the first camera sync time; and calculate an adjustment to adjust one or more video capture parameters of the device based on said first camera offset, so that a second camera offset, which is a difference between a timestamp time for a subsequent frame captured by the device and the second camera sync time, is smaller than the first camera offset.

2. The system of claim 1, wherein each of the plurality of devices is configured to:

compare said first camera offset with a threshold; and adjust said one or more video capture parameters of the device based on an amount by which the first camera offset exceeds said threshold.

3. The system of claim 1, wherein the system is further configured to:

determine one or more additional camera sync times, including by, for each of the one or more additional camera sync times, adding said integral number of camera periods to an immediately preceding camera sync time, wherein each of the plurality of devices is further configured to:

capture video using the camera of the device; and for each of the one or more additional camera sync times, determine that the additional camera sync time has passed, and, in response, determine a camera offset by calculating a difference between a timestamp time of a current frame captured by the device and the additional camera sync time, and then adjust one or more video capture parameters of the device based on said camera offset.

4. The system of claim 1, wherein each of the plurality of devices is configured such that, the adjusting of the one or more video capture parameters by the device comprises capturing a frame with an exposure time that is determined based on the first camera offset for the device.

5. The system of claim 1, wherein each of the plurality of devices is configured such that, the adjusting of the one or more video capture parameters by the device comprises temporarily increasing or decreasing a capture period for the device based on the first camera offset for the device.

6. The system of claim 1, wherein each of the plurality of devices is configured such that, the adjusting of the one or more video capture parameters by the device comprises ceasing video capture by the device for a period of time that is determined based on the first camera offset for the device.

7. The system of claim 1, wherein the at least one server is configured to:

store a current server time; and transmit a request to each of the plurality of devices for a current device time, wherein each of the plurality of devices is configured to transmit the current device time for the device to the at least one server, in response to receiving the request, and wherein the at least one server is further configured to determine a first clock offset for each of the plurality of devices, using the current server time, the current device time for the device, and a transmission time for communication between the at least one server and the device.

8. The system of claim 7, wherein the at least one server is configured to:

determine a second clock offset for each of the plurality of devices; and determine a clock drift for each of the plurality of devices by comparing the first and second clock offsets for the device.

9. The system of claim 1, wherein at least one of the plurality of devices is a smartphone.

10. A method for synchronizing video capture by respective cameras of a plurality of devices, the method comprising:

determining a camera period for the cameras of the plurality of devices, wherein the camera period is a time interval that substantially corresponds with a respective frame capture interval configured at each of the plurality of electronic devices, the frame capture interval being the time between successive captured frames;

determining a first camera sync time, including by adding an integral number of camera periods to a synchronized clock value;

determining a second camera sync time, including by adding an integral number of camera periods to the first camera sync time;

capturing video at each of the plurality of devices, using the respective cameras of the plurality of devices;

at each of the plurality of devices, once the device has determined that the first camera sync time has passed, determining a first camera offset by calculating a difference between a timestamp time of a current frame captured by the device, and the first camera sync time; and at each of the plurality of devices, calculating an adjustment to adjust one or more video capture parameters of the device based on said first camera offset, so that a second camera offset, which is a difference between a timestamp time for a subsequent frame captured by the device and the second camera sync time, is smaller than the first camera offset.

11. The method of claim 10, comprising, at each of the plurality of devices, comparing the first camera offset of the device with a threshold, wherein the adjusting of the one or more video capture parameters for the device is based on an amount by which the first camera offset for the device exceeds said threshold.

12. The method of claim 10, further comprising:

determining one or more additional camera sync times, including by, for each of the one or more additional camera sync times, adding said integral number of camera periods to an immediately preceding camera sync time;

capturing video using the camera of each of the plurality of devices; and for each of the plurality of devices and for each of the one or more additional camera sync times, once the device has determined that the additional camera sync time has passed, determining a camera offset by calculating a difference between a timestamp time of a current frame captured by the device and the additional camera sync time, and then adjusting one or more video capture parameters of the device based on said camera offset.

13. The method of claim 10, wherein said adjusting comprises, for each of the one or more devices, triggering the device to capture a frame with an exposure time that is determined based on the first camera offset for the device.

14. The method of claim 10, wherein said adjusting comprises, for each of the one or more devices, temporarily increasing or decreasing a capture period for the device based on the first camera offset for the device.

15. The method of claim 10, wherein said adjusting comprises, for each of the one or more devices, ceasing video capture by the device for a period of time that is determined based on the first camera offset for the device.

16. The method of claim 10, wherein at least one of the plurality of devices is a smartphone.

17. A device for capturing video, the device comprising:

at least one processor; a camera; and a non-transitory computer readable storage medium comprising instructions, which, when executed by the at least one processor, cause the device to:

receive a synchronized clock value from at least one server;

determine a first camera sync time, including by adding an integral number of camera periods to the synchronized clock value, wherein a camera period is a time interval that substantially corresponds with a frame capture interval configured at the device, the frame capture interval being the time between successive frames captured by the device;

determine a second camera sync time, including by adding an integral number of camera periods to the first camera sync time;

capture video using the at least one camera;

determine that the camera sync time has passed, and, in response, determine a first camera offset by calculating a difference between a timestamp time for a current frame captured by the device, and the first camera sync time;

calculate an adjustment to adjust one or more video capture parameters of the device based on said first camera offset, so that a second camera offset, which is a difference between a timestamp time for a subsequent frame captured by the device and the second camera sync time, is smaller than the first camera offset; and send the video to the at least one server.

18. The device of claim 17, wherein the instructions, when executed by the at least one processor, cause the device to:

determine one or more additional camera sync times, including by, for each of the one or more additional camera sync times, adding said integral number of camera periods to an immediately preceding camera sync time;

capture video using the camera; and for each of the one or more additional camera sync times, once the device has determined that the additional camera sync time has passed, determine a camera offset by calculating a difference between a timestamp time of a current frame captured by the device and the additional camera sync time, and then adjust one or more video capture parameters of the device based on said camera offset.

19. The device of claim 17, wherein the device is a smartphone.

* * * * *